US009279590B2

(12) United States Patent
Bohan et al.

(10) Patent No.: US 9,279,590 B2
(45) Date of Patent: Mar. 8, 2016

(54) WARM WEATHER BOILER SHUTDOWN (75) Inventors: John Bohan, Avon Lake, OH (US); Chris Fildes, Elyria, OH (US); Tim Beight, Amherst, OH (US)

(73) Assignee: R.W. Beckett Corporation, North Ridgeville, OH (US)

( * ) Notice: Subject to any disclaimer, the term of this patent is extended or adjusted under 35 U.S.C. 154(b) by 690 days.

(21) Appl. No.: 13/612,291

(22) Filed: Sep. 12, 2012

(65) Prior Publication Data
US 2014/0070014 A1 Mar. 13, 2014

(51) Int. Cl.
*F24D 19/10* (2006.01)
*F24D 3/00* (2006.01)
*G05D 23/19* (2006.01)
*F24D 11/00* (2006.01)

(52) U.S. Cl.
CPC *F24D 3/00* (2013.01); *F24D 19/10* (2013.01); *F24D 19/1009* (2013.01); *G05D 23/1919* (2013.01); *F24D 11/004* (2013.01)

(58) Field of Classification Search
CPC ... F24D 19/1009; F24D 19/10; F24D 11/004; F24H 9/2007
USPC ...... 237/8 A, 8 B, 12, 2 A, 59, 81; 122/14.21
IPC ..................................... F24D 3/00, 11/00, 19/10
See application file for complete search history.

(56) References Cited

U.S. PATENT DOCUMENTS

| | | | | | |
|---|---|---|---|---|---|
| 3,482,778 | A | * | 12/1969 | Lanzoni | 237/8 R |
| 4,016,402 | A | * | 4/1977 | Scott | F24H 9/2007 392/464 |
| 4,168,491 | A | * | 9/1979 | Phillips et al. | 340/501 |
| 5,244,146 | A | * | 9/1993 | Jefferson | G05D 23/1909 165/269 |
| 5,622,221 | A | * | 4/1997 | Genga et al. | 165/208 |
| 5,831,345 | A | * | 11/1998 | Michaud | 307/38 |
| 6,062,485 | A | * | 5/2000 | Stege | G05D 23/1931 237/2 A |
| 6,464,027 | B1 | * | 10/2002 | Dage | B60H 1/004 123/41.14 |
| 7,284,709 | B2 | * | 10/2007 | Guyer | 237/12.1 |
| 8,490,886 | B2 | * | 7/2013 | Cohen | 237/8 A |
| 8,757,509 | B2 | * | 6/2014 | Anderson | F24H 9/2035 122/14.1 |
| 2004/0256477 | A1 | * | 12/2004 | Paul | G05D 23/1951 237/12 |
| 2005/0161521 | A1 | * | 7/2005 | Guyer | 237/12.1 |

(Continued)

FOREIGN PATENT DOCUMENTS

| | | | | | |
|---|---|---|---|---|---|
| GB | 2086088 | A | * | 5/1982 | F24D 3/02 |
| JP | 61062732 | A | * | 3/1986 | |

(Continued)

*Primary Examiner* — Gregory Huson
*Assistant Examiner* — Daniel E Namay
(74) *Attorney, Agent, or Firm* — Eschweiler & Associates, LLC (57) ABSTRACT The present disclosure relates to an apparatus for automatically shutting down a boiler system when it is not needed (e.g., during warm weather) based upon calls for heat output by a temperature control element (e.g., thermostat) within a facility. The apparatus has a temperature control element that provides calls for heat to a controller when a temperature within a facility is below a setting value. The controller controls operation of a boiler, having a medium with a temperature between a low limit and a high limit, in response to the call for heat. A monitoring element determines a prevalence of calls for heat and selectively adjusts the low limit based upon the determined prevalence of calls for heat. Therefore, when calls for heat are less frequent the monitoring element will reduce the low limit to reduce fuel consumption of the boiler.

20 Claims, 6 Drawing Sheets

(56) References Cited

U.S. PATENT DOCUMENTS

| | | | | |
|---|---|---|---|---|
| 2008/0314999 | A1* | 12/2008 | Strand | G05D 23/1919 236/20 R |
| 2009/0001186 | A1* | 1/2009 | Cohen | 237/8 A |
| 2010/0096467 | A1* | 4/2010 | Kim | G05D 23/1919 237/12 |
| 2010/0193595 | A1* | 8/2010 | Gwak | F24D 19/1048 237/56 |
| 2011/0127343 | A1* | 6/2011 | Rimmer | 237/9 R |
| 2012/0165992 | A1* | 6/2012 | Fildes | F23N 1/082 700/277 |
| 2013/0051777 | A1* | 2/2013 | Brian | F24H 1/20 392/464 |
| 2013/0077944 | A1* | 3/2013 | Tugurlan | F28F 27/00 392/441 |
| 2013/0299600 | A1* | 11/2013 | Beckers | 237/8 A |
| 2013/0327843 | A1* | 12/2013 | Monetti | 237/8 A |

FOREIGN PATENT DOCUMENTS

| | | | | | |
|---|---|---|---|---|---|
| JP | 02230028 | A | * | 9/1990 | |
| JP | 03158626 | A | * | 7/1991 | |
| JP | 05060379 | A | * | 3/1993 | F24H 1/10 |

* cited by examiner

WARM WEATHER BOILER SHUTDOWN

BACKGROUND

Boiler systems have been used to regulate the temperature of commercial and residential facilities for a number of years. However, despite the fact that boiler systems have been around for many years, innovations continue to change the manner in which these systems operate.

Conventional boiler controllers are often configured to constrain a temperature of a medium (e.g., water) comprised within a boiler (or other type heating appliance) between a low limit (LL) and a high limit (HL). The high limit (HL) is employed to prevent the medium temperature from exceeding some predetermined level to avoid a situation where a medium having an undesirably high temperature reaches a recipient. The low limit (LL) is typically set by a technician or as a default value to maintain the medium at some minimum level.

The low limit (LL) is important in extending the life and improving the safety of boilers. For example, excessive cold boiler starts may cause the boiler block to crack due to the thermal shock of starting a cold boiler. Furthermore, cold boiler water causes condensation of combustion flue products, which can accelerate corrosion of vent systems and heat exchangers. If the corrosion causes a breach of the vent system, combustion products may enter the home and pose a health hazard to its occupants.

DETAILED DESCRIPTION

The present disclosure will now be described with reference to the drawings where like reference numerals are used to refer to like elements throughout, and where the illustrated structures are not necessarily drawn to scale. Nothing in this detailed description is admitted as prior art.

Figure 1:
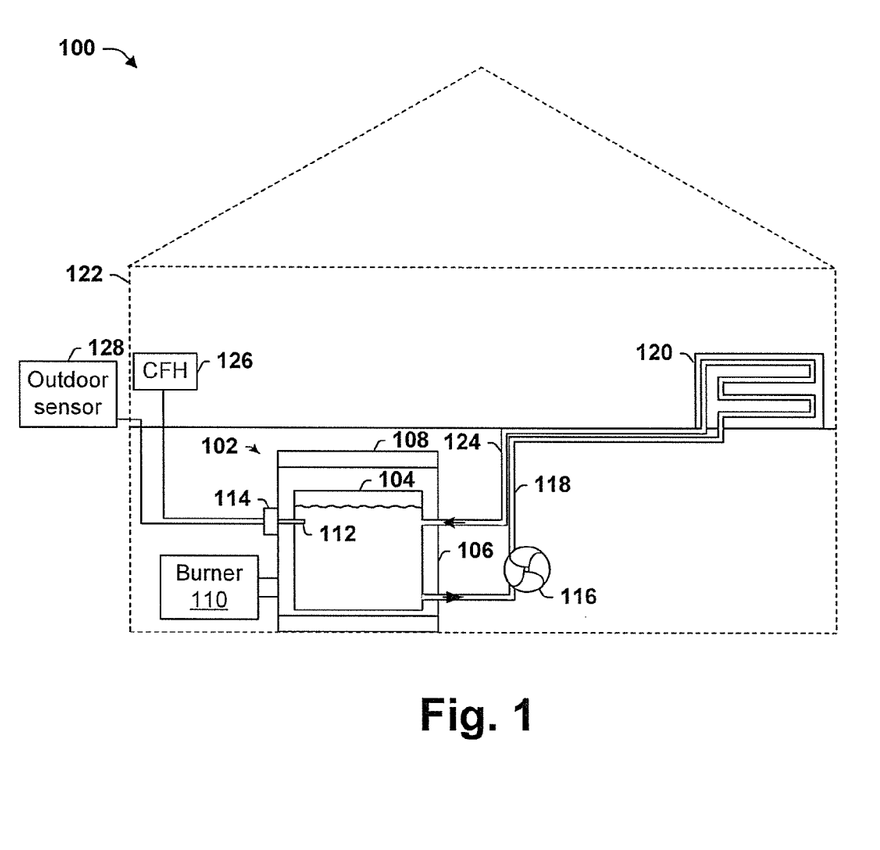
FIG. 1 is a diagram of conventional boiler system having an outdoor sensor configured to enable a warm weather shutdown procedure.

FIG. 1 illustrates a conventional boiler system 100 having an outdoor temperature sensor 128 configured to enable a warm weather shutdown procedure. The boiler system 100 includes a boiler 102 comprising a storage tank 104 surrounded by an insulating material layer 106, which is encased within a boiler enclosure 108. A medium heating element 110 works in conjunction with a temperature sensor 112 directed by a boiler controller 114 to heat a medium within the storage tank 104 to a desired temperature. After the medium is heated to the desired temperature, a circulation pump 116 pumps the heated medium by way of an outbound line 118 to a radiating element 120, which radiates heat within a residential or commercial facility 122. The heated medium returns from the radiating element 120 through a return line 124 to the storage tank 104.

The boiler controller 114 is connected to a temperature control element 126 located within the facility 122 and an outdoor temperature sensor 128 located outside of the facility 122. The temperature control element 126 is configured to provide a call for heat to the controller 114 when a temperature within the facility 122 falls below a setting value of the temperature control element 126. The outdoor temperature sensor 128 is configured to detect a temperature outside of the facility 122 (i.e., an outdoor temperature) and to relay the detected outdoor temperature back to the controller 114. If the outdoor temperature is above a certain level, the controller 114 determines that there is no need for the boiler 102 and turns it off.

While outdoor temperature sensors save fuel by not operating a boiler when it is not needed, such sensors require significant effort to install and can provide aberrant readings, for example, if physically located next to an external dryer vent, or when located in a sunny location.

Accordingly, the present invention relates to a method and apparatus for automatically shutting down a boiler system when it is not needed (e.g., during warm weather) based upon calls for heat output by a temperature control element (e.g., thermostat) within a facility. By enabling an automatic shutdown procedure based upon calls for heat output by a temperature control element, the problems faced by outdoor sensor systems are eliminated.

In some embodiments, the apparatus comprises a temperature control element configured to provide calls for heat to a controller when a temperature of a facility is below a setting value of the temperature control element. The controller controls operation of a boiler containing a medium having a temperature between a low limit and a high limit. During operation the controller increases the temperature of the medium in response to the calls for heat. A monitoring element is configured to determine a prevalence of the calls for heat and to selectively adjust the low limit based upon the determined prevalence of the calls for heat. Therefore, when calls for heat are less frequent the monitoring element will reduce the low limit to reduce fuel consumption of the boiler.

Figure 2:
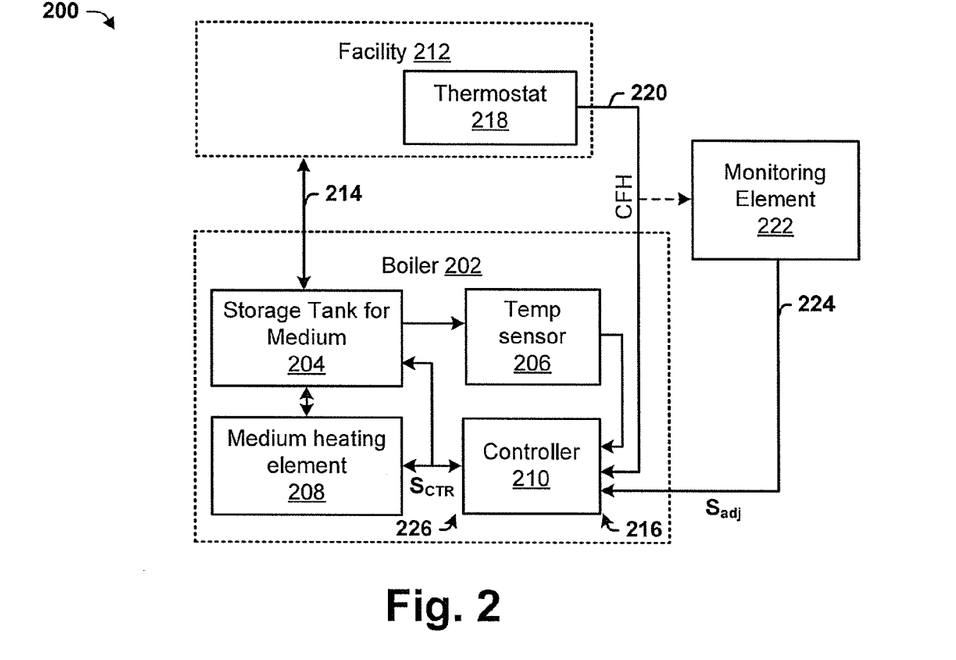
FIG. 2 is block diagram of a disclosed boiler system having a monitoring element configured to selectively adjust the low limit of a boiler system controller based upon detected calls for heat.

FIG. 2 illustrates a block diagram of a boiler system 200 comprising a monitoring element 222 configured to selectively adjust a low limit (LL) of the boiler system 200 (e.g., turn off the boiler system 200) based upon the prevalence of the calls for heat during a temporal monitoring window.

As shown in FIG. 2, the boiler system 200 comprises a boiler 202 having a storage tank 204 in which a medium (e.g., water or a water glycol mix) is stored, a temperature sensor 206 for detecting the temperature of the medium in the storage tank 204, and a medium heating element 208 (e.g., gas burner, oil burner, or electric heater). The boiler 202 is configured to exchange the medium with a facility 212 by way of a piping 214, wherein a temperature of the facility 212 is regulated by heat radiated from the medium.

A controller 210 is operable to control operation of the boiler 202. In some embodiments, the controller 210 comprises an input interface 216 connected to a temperature control element 218 (e.g., a thermostat) by way of a first communication channel 220. The temperature control element 218 is configured to monitor a temperature within the facility 212 and to generate a call for heat (CFH) when the temperature within the facility 212 falls below a setting value of the temperature control element 218. For example, if the temperature control element 218 is set to maintain a temperature of 70° within the facility 212, it will generate a call for heat when a temperature within the facility 212 falls below 70°. The call for heat causes the controller 210 to generate a control signal $S_{CTR}$, provided at an output interface 226 of the controller, which causes the medium heating element 208 to operate to increase the temperature of the medium within the storage tank 204. When the heated medium is provided to the facility 212, it increases the temperature of the facility 212.

The input interface 216 is further connected to a monitoring element 222 by way of second communication channel 224. The monitoring element 222 is configured to detect calls for heat provided from the temperature control element 218 to the controller 210 and to determine a prevalence of the calls for heat. Based upon the prevalence of the calls for heat, the monitoring element 222 is configured to generate an adjustment signal $S_{adj}$ that selectively provided to controller 210 to adjust the low limit (LL) of the controller 210.

By monitoring the prevalence of calls for heat within a monitoring window (e.g., 1 day, 2 days, etc.), the monitoring element 222 can determine the extent to which the boiler 202 is being used to heat the facility 212. For example, a low prevalence of calls for heat within a monitoring window indicate that the boiler 202 is rarely being used to heat the facility 212 and that the low limit (LL) of controller 210 can be reduced to reduce the fuel consumption of the boiler system 200. Conversely, a high prevalence of calls for heat within a monitoring window indicates that the boiler 202 is being used often to heat the facility 212 and that the (LL) low limit of the controller 210 is not to be reduced.

In some embodiments, the monitoring element 222 determines a prevalence of calls for heat by detecting a total number of calls for heat over a monitoring window. If the total number of calls for heat is below a threshold value, the monitoring element 222 is configured to generate an adjustment signal $S_{adj}$ that causes the controller 210 to reduce its low limit (LL). In some embodiments, if the total number of calls for heat is below the threshold value, the adjustment signal $S_{adj}$ causes the controller 210 to execute a warm weather shutdown procedure that turns off the boiler 202 (i.e., setting the low limit equal to room temperature).

In other embodiments, the monitoring element 222 determines a prevalence of calls for heat by detecting a total amount of time in which call for heat are made over a monitoring window. For example, if 10 calls for heat, each lasting 8 minutes, are made over a monitoring window, the monitoring element 222 would detect a total amount of time in which calls for heat are made of 80 minutes. If the total time of calls for heat is below a threshold value, the monitoring element 222 is configured to generate an adjustment signal $S_{adj}$ that causes the controller 210 to reduce its low limit (e.g., to execute a warm weather shutdown procedure that turns off the boiler 202).

The monitoring element 222 may detect a call for heat in various ways. In some embodiments, the monitoring element 222 may detect calls for heat by monitoring the first communication channel 220 to directly detect a call for heat signal output by the temperature control element 218. In other embodiments, the monitoring element 222 may detect calls for heat by indirectly detecting a quantity that indicates that a call for heat has been issued by the temperature control element 218. For example, the monitoring element may detect a call for heat by detecting an increase in the temperature of the medium to a temperature above a low limit differential (See, FIG. 4B).

It will be appreciated that the term 'communication channel' includes any medium of communication. For example, in some embodiments the first and second communication channels may comprise physical wires extending between elements, while in alternative embodiments the first and second communication channels may comprise wireless communication channels.

Figure 3:
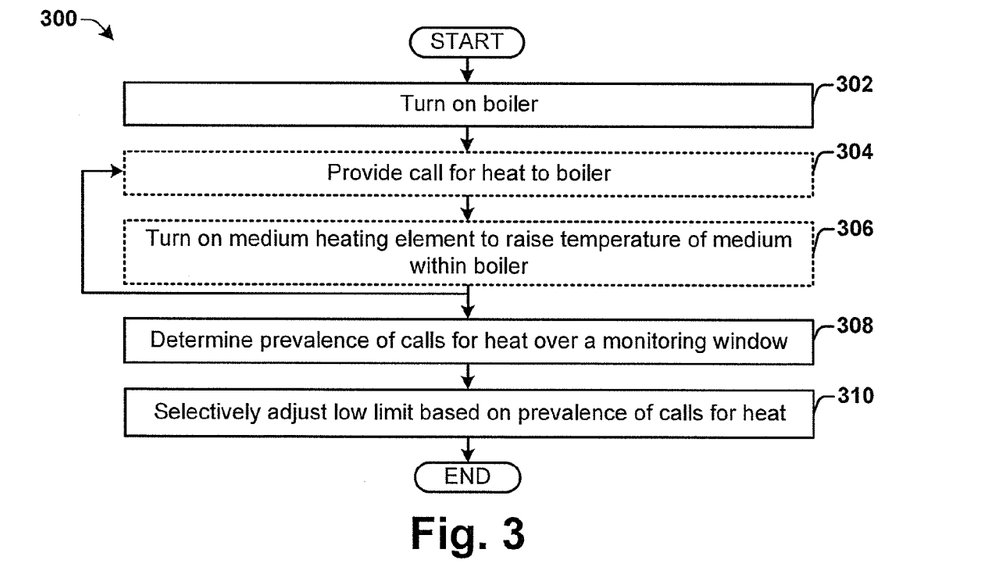
FIG. 3 is a flow diagram showing some embodiments of a method for reducing a controller low limit (LL) based upon a prevalence of calls for heat.

FIG. 3 is a flow diagram showing some embodiments of a method for reducing a controller low limit (LL) based upon a prevalence of calls for heat. While the exemplary method 300 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention.

At 302 a boiler is turned on. Turning on the boiler system causes the boiler system to increase the temperature of a medium within the boiler to at least a low limit (LL). Once the boiler is turned on, it will regulate the temperature of the medium between the low limit (LL) and a high limit (HL).

At 304 a call for heat may be provided to the boiler. A call for heat is received from a temperature control element (e.g., a thermostat) when the temperature control element determines that a temperature of an associated facility is below a setting value.

In response to the call for heat, a medium heating element within the boiler is activated at 306. Activating the medium heating element raises the temperature of a medium that is held within the boiler. Steps 304 and 306 may be repeated multiple times over a time period (e.g., monitoring window) such that a plurality of calls for heat are provided to the boiler.

At 308 a prevalence of calls for heat is determined over a monitoring window. In some embodiments, the prevalence of calls for heat is determined by measuring a total number of calls for heat over the monitoring window. In other embodiments, the prevalence of calls for heat is determined by measuring a total time in which calls for heat are made over the monitoring window. The monitoring window comprises a time period (e.g., 12 hrs, 1 day, etc.).

At 310 the low limit is selectively adjusted based upon the prevalence of the calls for heat. In some embodiments, the low limit is reduced in proportion to the prevalence of calls for heat. In other embodiments, if the prevalence of calls for heat is below a threshold value, the boiler system is turned off, effectively setting the low limit to room temperature.

Figure 4A:
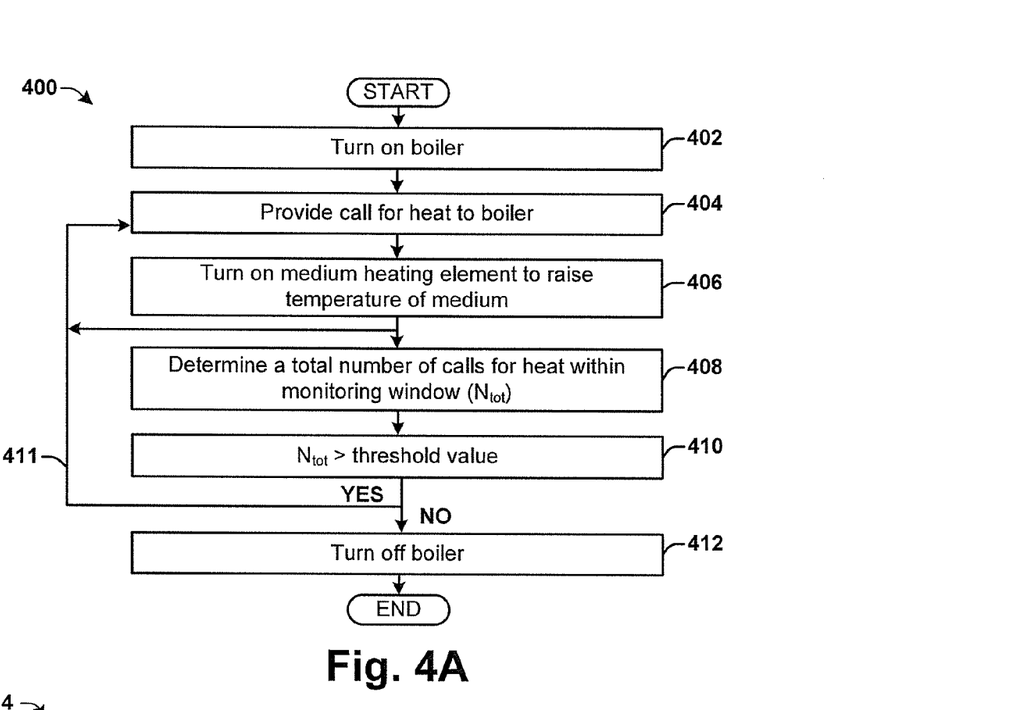
FIG. 4A is a flow diagram showing some embodiments of a method for executing a warm weather shutdown procedure based upon detected calls for heat.
Figure 4B:
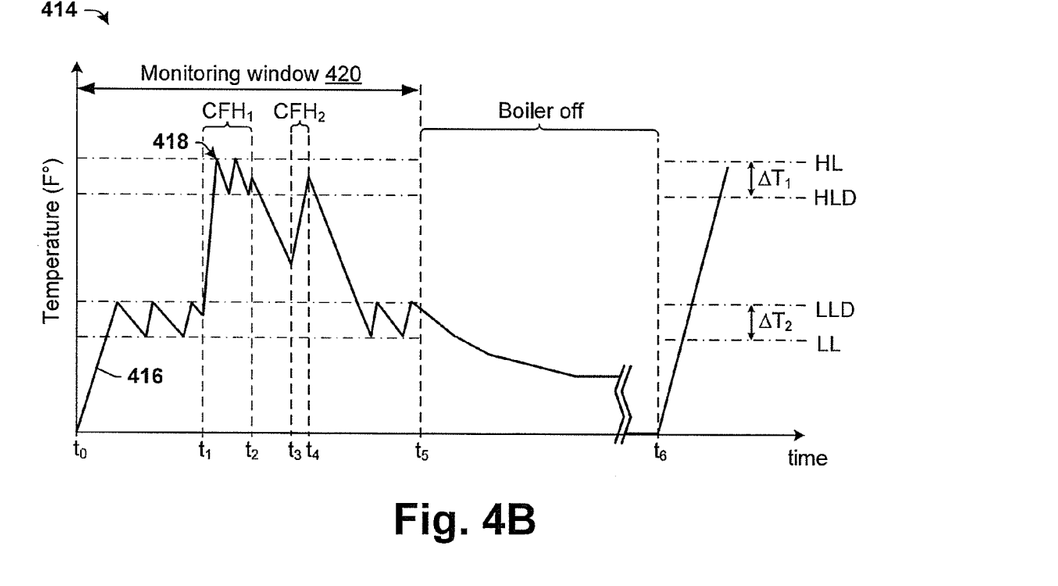
FIG. 4B is a timing diagram of medium temperature of a boiler system operated according to the method of FIG. 4A.

FIG. 4A is a flow diagram showing some embodiments of a method 400 for executing a warm weather shutdown of a boiler system based upon detected calls for heat. FIG. 4B illustrates a timing diagram 414 showing a medium temperature of a boiler system operated according to method 400. It will be appreciated that although timing diagram 414 illustrates a boiler system that is configured to turn off if the detected total number of calls for heat over a monitoring window is less than a threshold value of four (4), that any threshold value can be used.

At 402 the boiler is turned on. Turning on the boiler causes the boiler to increase the temperature of a medium within a storage tank until it reaches a low limit (e.g., 140° F.). The low limit comprises a minimum level that the temperature of the medium is not permitted to fall below.

For example, as shown in FIG. 4B, at time $t_0$ the boiler is turned on. Upon turning on the boiler a medium heating element (e.g., boiler) is activated, causing the temperature of the medium 416 to steadily increase. Once the temperature of the medium 416 has reached the low limit (LL), a controller may operate to maintain the temperature of the medium 416 at a value that is between the low limit and a low limit differential (LLD), which exceeds the low limit (LL) by an amount $\Delta T_2$. For example, when the temperature of the medium 416 falls below the low limit (LL) 202, the medium heating element is activated despite no call for heat. The medium heating element remains on (via the controller) until the temperature of the medium 416 reaches the low level differential (LLD), at which time the controller instructs the medium heating element to turn off, allowing the temperature of the medium 416 to slowly decrease back toward the low limit (LL) 202. The boiler will then cycle the medium heating element on and off to as shown.

At 404 a call for heat may be provided to the boiler.

In response to a call for heat, a medium heating element is operated to raise the temperature of a medium at 406. The temperature of the medium will increase until either the call for heat is ended or the temperature of the medium has reached a high limit (HL) (e.g., 200° F.). Steps 404 and 406 may be repeated multiple times over a time period (e.g., monitoring window) such that a plurality of calls for heat are provided to the boiler.

For example, as shown in FIG. 4B, at time $t_1$, a first call for heat ($CFH_1$) is received by a controller, and a medium heating element is turned on, causing the temperature of the medium 416 to steadily increase. Once the temperature of the medium 416 reaches the high limit (HL) at 418, the medium heating element is deactivated by the controller to prevent the temperature of the medium 416 from exceeding the high limit (HL), thus resulting in a decrease in medium temperature despite the first call for heat ($CFH_1$) still being asserted. Once the temperature of the medium 416 falls below the high limit differential (HLD), the controller activates the medium heating element as long as the first call for heat ($CFH_1$) is still asserted. The control cycle between the high limit (HL) and the high limit differential (HLD) then continues until the first call for heat ($CFH_1$) time period ends at time $t_2$.

At a later time $t_3$, a second call for heat ($CFH_2$) is received by the controller and the medium heating element is turned on, causing the temperature of the medium 416 to steadily increase. The second call for heat ($CFH_2$) is finished at time $t_4$ and the controller turns off the medium heating element. The temperature of the medium 416 will decrease absent another call for heat until the temperature of the medium 416 falls below the low limit (LL).

At 408 a total number of calls for heat is determined over a monitoring window. As shown in FIG. 4B, in a monitoring window 420 extending from time $t_0$ to a time $t_5$ two calls for heat ($CFH_1$ and $CFH_2$) are received.

At 410 the total number of calls for heat is compared to a threshold value. If the total number of calls for heat is greater than the threshold value, it indicates that the boiler is being used frequently and the boiler is kept on (arrow 411). However, if the total number of calls for heat is less than the threshold value, it indicates that the boiler is not being used frequently and the boiler is turned off at 412 to reduce fuel costs.

As shown in FIG. 4B, since the detected two calls for heat over monitoring window 420 are less than the threshold value of four (4), the controller turns off the boiler, allowing the temperature of the medium to be reduced to below the low limit (LL).

It will be appreciated that during operation of a boiler a monitoring window having a constant value will dynamically change its position in time. In particular, the monitoring window will extend backwards from a present time by a time value equal to the size of the monitoring window (i.e., the monitoring window will determine a prevalence of calls for heat over a monitoring window extending backwards in time from the present time).

Figure 5:
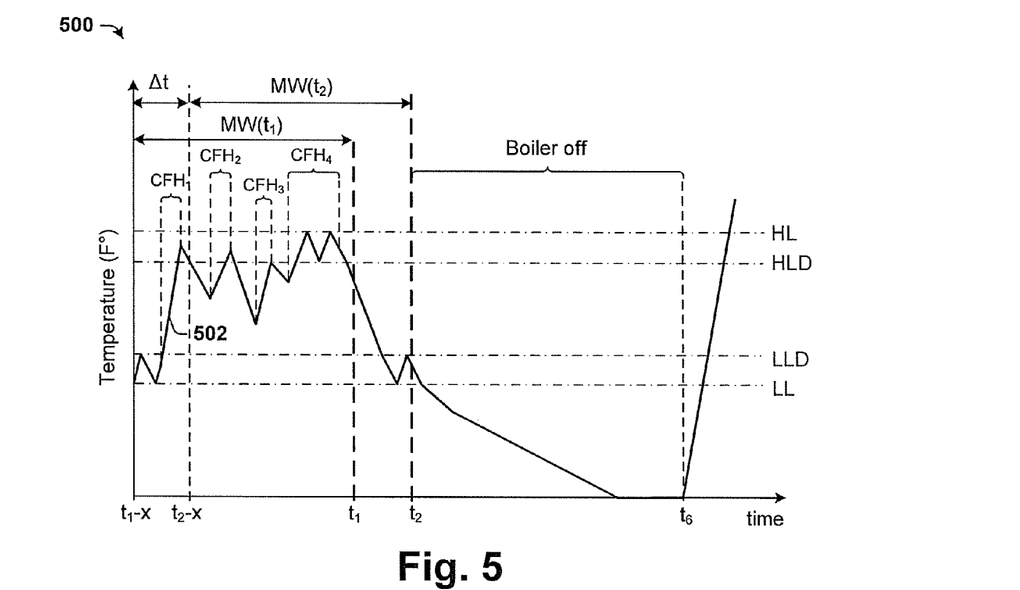
FIG. 5 is timing diagram illustrating how a monitoring widow changes in a boiler system executing a warm weather shutdown procedure of a boiler based upon detected calls for heat.

FIG. 5 is timing diagram 500 illustrating how a monitoring widow changes in a boiler system executing a warm weather shutdown of a boiler based upon detected calls for heat. It will be appreciated that although timing diagram 500 illustrates a medium temperature for a boiler that is configured to turn off if the detected total number of calls for heat over a monitoring window is less than a threshold value of four (4), any threshold value can be used.

At a first time $t_1$, a monitoring window $MW(t_1)$ extends from a time $t_1$ to a time $t_1-x$, where x is the size of the monitoring window. During the duration of monitoring window $MW(t_1)$, the controller receives four calls for heat: $CFH_1$, $CFH_2$, $CFH_3$, and $CFH_4$. Since the total number of calls for heat, four, is equal to the threshold value of four, the controller keeps the boiler on and the temperature of the medium 502 is not allowed to go below the low limit (LL).

At a second time $t_2$, the position of the monitoring window $MW(t_2)$ has dynamically changed so that it extends from a time $t_2$ to a time $t_2-x$. During the duration of monitoring window $MW(t_2)$, the controller receives three calls for heat: $CFH_2$, $CFH_3$, and $CFH_4$. Since the total number of calls for heat, three, is less than the threshold value of four, the controller turns off the boiler and the temperature of the medium 502 is allowed to go below the low limit (LL).

It will be appreciated that in the disclosed boiler system, which is configured to selectively adjust the low limit of a boiler controller, the size of the monitoring window and threshold value has a direct correlation to operation of a boiler system. Accordingly, in some embodiments the monitoring element can dynamically vary the size of the monitoring window and threshold value to adjust operation of the boiler system. For example, the monitoring window and threshold value may be set to different values depending on the season (e.g., the monitoring window and threshold value may be set higher in the fall and spring than in the summer).

In particular, controlling the size of the monitoring window influences how quickly a boiler system is turned off (e.g., the size of the monitoring window is proportional to the time it will take for the boiler to turn off). For example, increasing the size of a monitoring window causes a boiler to turn off less quickly, resulting in less cold boiler starts. Alternatively, decreasing the size of a monitoring window causes a boiler to turn off more quickly, potentially saving fuel. In some embodiments, the size of a monitoring window is selected to have a size that minimizes the number of cold boiler starts due to weather changes.

Similarly, controlling the threshold value of calls for heat influences how often a boiler is turned off. Increasing the threshold value will cause the boiler to turn off more often. For example, a boiler system having a threshold value of one (1) will turn off if no calls for heat are made over a monitoring window, while a boiler system using a threshold value of two (2) will turn off if zero or one calls for heat are made over the monitoring window. Alternatively, decreasing the threshold value will cause the boiler system to turn off less often (e.g., if the temperature within a facility is high at day and low overnight, the threshold value can be set to a number that does not turn off the boiler). For example, a boiler system having a threshold value of ten (10) will turn off if nine or less calls for heat are made over a monitoring window, while a boiler system having a threshold value of five (5) will turn off with five or less calls for heat over the monitoring window.

Figure 6:
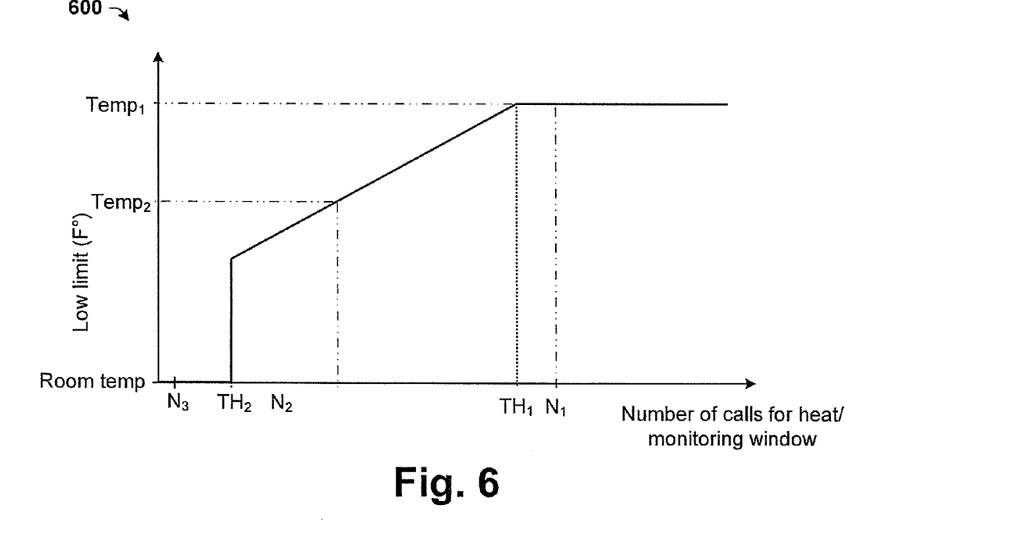
FIG. 6 illustrates a graph showing the dynamic adjustment of a low limit based upon a total number of calls for heat within a monitoring window.

In some embodiments, the monitoring element is configured to dynamically adjust a low limit (LL) set by the controller based upon a prevalence of calls for heat. FIG. 6 illustrates a graph 600 showing the dynamic adjustment of a low limit based upon a total number of calls for heat within a monitoring window. The graph illustrates the low limit (LL) in degrees Fahrenheit on the y-axis and the total number of calls for heat per monitoring window on the x-axis.

As shown in graph 600, as long as the total number of calls for heat over a monitoring window is greater than or equal to a first threshold value $TH_1$, the low limit (LL) is set equal to a first temperature value ($Temp_1$). However, if the total number of calls for heat decreases below a first threshold value $TH_1$, the low limit (LL) is dynamically reduced to a second temperature value ($Temp_2$), which is less than the first temperature value ($Temp_1$). For example, as shown in graph 600, if the total number of calls for heat is a first number of calls for heat $N_1$ the low limit (LL) is set to $Temp_1$ (e.g., 140°). However, if the total number of calls for heat decreases to a second number of calls for heat ($N_2 < N_1$) the low limit (LL) is set to $Temp_2$ (e.g., 120°). In some embodiments, if the total number of calls for heat decreases below a second threshold value ($TH_2$), the boiler is turned off, effectively setting the low limit (LL) equal to room temperature. For example, as shown in graph 600 if the total number of calls for heat decrease to $N_3 < TH_2$, the boiler is turned off.

The goal of such a dynamic low limit is that when external temperatures are cold, the boiler system benefits from a higher low limit (LL) to meet the more demanding heating needs of a cold environment, while for warmer temperatures, a cooler average water temperature may still effectively meet the less stringent heating needs while consuming less fuel.

Figure 7A:
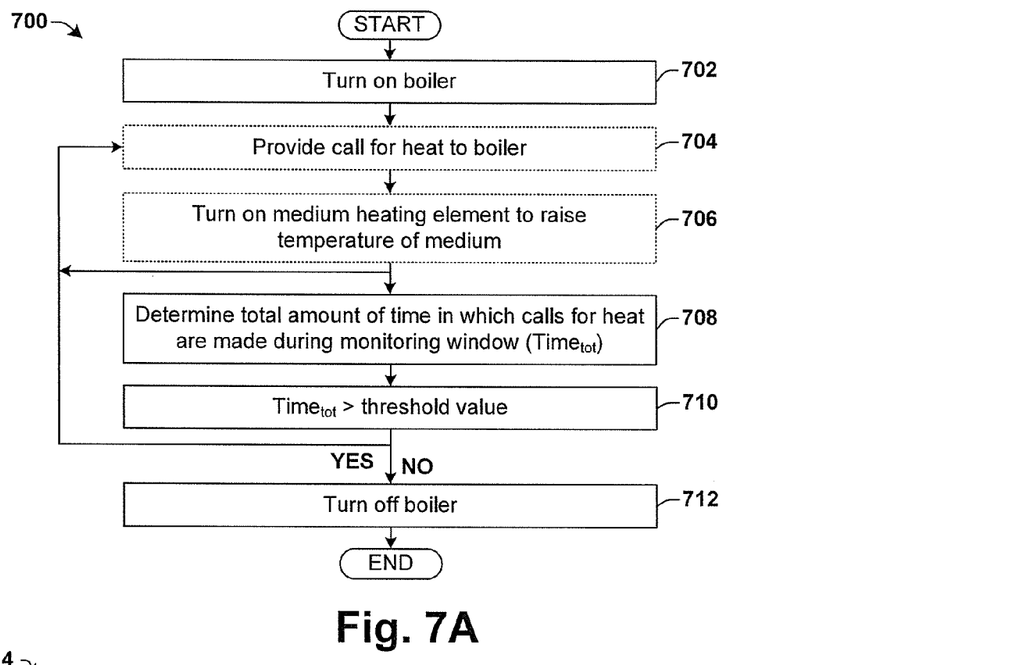
FIG. 7A is a flow diagram showing some alternative embodiments of a method for executing a warm weather shutdown procedure based upon detected calls for heat.
Figure 7B:
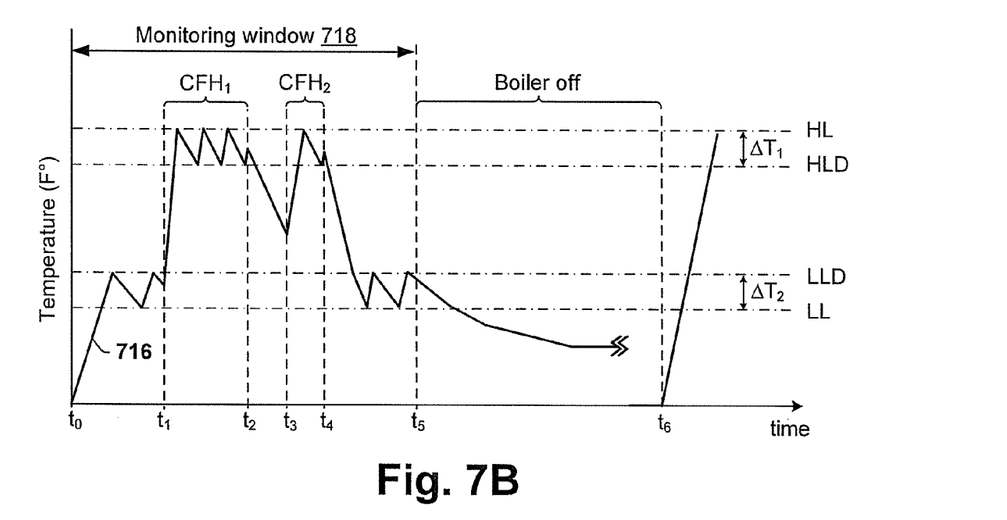
FIG. 7B is a timing diagram of medium temperature of a boiler system operated according to the method of FIG. 7A.

FIG. 7A is a flow diagram showing some alternative embodiments of a method 700 for executing a warm weather shutdown procedure of a boiler based upon a total time in which calls for heat are made. FIG. 7B is a timing diagram 714 of a medium temperature for a boiler system operated according to method 700.

At 702 the method turns on a boiler configured to heat a medium. As shown in timing diagram 714, at time $t_0$ the boiler system is turned on. Turning on the boiler causes the temperature of the medium 716 to increase until it reaches a low limit comprises a minimum level that the temperature of the medium is not permitted to fall below.

At 704 a call for heat may be provided to the boiler.

In response to a call for heat, a heating element is operated to raise a temperature of a medium at 706. Steps 704 and 706 may be repeated multiple times over a time period (e.g., monitoring window) such that a plurality of calls for heat are provided to the boiler. For example, as shown in timing diagram 714, at time $t_1$, a first call for heat ($CFH_1$) is received by a controller. The first call for heat ($CFH_1$) is asserted from time $t_1$ to time $t_2$. At time $t_3$ a second call for heat ($CFH_2$) is received by the controller. The second call for heat ($CFH_2$) is asserted from time $t_3$ to time $t_4$.

At 708 a total amount of time in which calls for heat are made is determined over a monitoring window. In timing diagram 714, the total amount of time in which calls for heat are made is equal to $time_{tot} = (t_2 - t_1) + (t_4 - t_3)$.

At 710 the total amount of time in which calls for heat are made is compared to a threshold value. If the total amount of time in which calls for heat are made is greater than the threshold value, the boiler is kept on. However, if the total amount of time in which calls for heat are made is less than the threshold value, the method turns off the boiler at 712.

As shown in FIG. 7B, the total amount of time in which calls for heat are made over monitoring window 718 is less than the threshold value, causing the controller to turn off the boiler, allowing the temperature of the medium to be reduced to below the low limit (LL).

Figure 8:
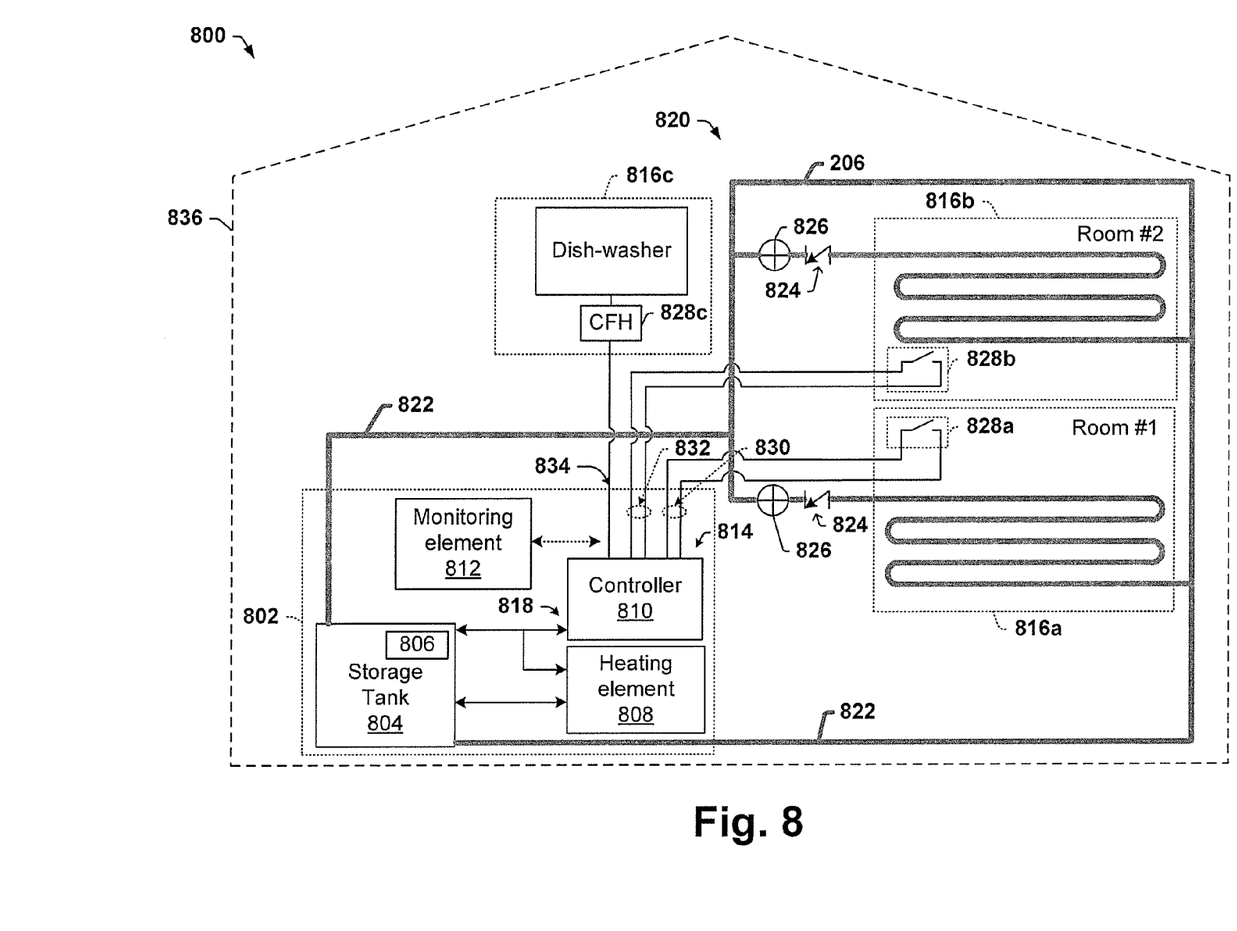
FIG. 8 is a block diagram of a boiler system comprising a plurality of zones, respectively configured to send calls for heat to a boiler.

FIG. 8 shows an example of a boiler system 800 that delivers a heated medium to different zones of a residential or commercial facility 836.

The boiler system 800 comprises a boiler 802 including a storage tank 804 in which the medium is stored, a temperature sensor 806 for detecting the temperature of the medium in the storage tank 804, and a medium heating element 808 (e.g., gas burner, oil burner, or electric heater). In addition, the boiler 802 includes a controller 810 and a monitoring element 812. The controller 810 includes an input interface 814 that is operable to receive calls for heat from multiple zones 816 (e.g., zones 816a-816c), as well as an output interface 818 for delivering one or more control signals.

A medium delivery system 820 typically includes a series of pipes 822, valves 824, and circulators 826 positioned throughout the facility 836. These components respond to various control signals to circulate the heated medium through the multiple zones 816 (e.g., zones 816a-816c). The control signals for the medium delivery system 820 can stem from a controller 810 in the boiler 802 or from other controllers located elsewhere in the boiler system 800.

The zones 816 can include respective temperature control elements 828 configured to provide calls for heat to controller 810. In particular, first and second zones 816a, 816b are illustrated as first and second rooms having first and second temperature control elements 828a, 828b, respectively. The first and second temperature control elements 828a, 828b are shown as thermostats that each have a 2-wire connection coupled to first and second terminals 830, 832 on the input interface 814 of the controller 810. A third zone 816c is shown as a commercial dishwasher having a temperature control element 828c, which is shown as having a single line connection coupled to a third terminal 834 on the input interface 814 of the controller 810. It will be appreciated that although specific interfaces are shown for various zones (e.g., first zone has a thermostat with a 2-wire connection), the interfaces could be permuted relative to the zones (e.g., first zone could have thermostat with a wireless connection) and other interfaces could also be used During operation, temperature control elements 828 within the different zones 816a-816c are configured to provide calls for heat to the controller 810. The monitoring element 812 is configured monitor calls for heat from the different zones 816a-816c.

In some embodiments, the monitoring element 812 is configured to collectively monitor the calls for heat from the different zones 816a-816c in a manner that determines a prevalence of calls for heat from the facility as a whole. In such embodiments, the monitoring element 812 is configured to generate an adjustment signal that turns off the boiler 802 if a collective number of calls for heat is less than the threshold value. For example, in one example, wherein the threshold value is 4, over a monitoring window 2 calls for heat are received from 828a, 1 calls for heat are received from 828b, 3 calls for heat are received from 828c. A monitoring element 812 configured to collectively monitor the calls for heat will determine a total number of calls for heat of 6 calls for heat over a monitoring window. Since the 6 calls for heat are greater than a threshold value the monitoring element will not turn off the boiler 802.

In other embodiments, the monitoring element 812 is configured to separately monitor the calls for heat from the different zones 816a-816c in a manner that determines a prevalence of calls for heat from different zones. In such embodiments, if a zone sends a call for heat (e.g., the dishwasher is in use or radiative heat is needed), the controller 810 identifies the zone or zones from which the call for heat originates. The monitoring element detects such calls for heat and generates an adjustment signal that turns off the boiler 802 if the number of calls for heat over a time period is less than a threshold value for each of the separate zones.

For example, in one example, wherein the threshold value is 4, over a monitoring window 2 calls for heat are received from 828a, 1 calls for heat are received from 828b, 3 calls for heat are received from 828c. A monitoring element 812 configured to separately monitor the calls for heat will determine a 2, 1, and 3 calls for heat over a monitoring window. Since neither 2, 1, or 3 calls for heat are greater than a threshold value the boiler 802 is turned off.

Although examples have been described above in the context of a temperature regulation system having a storage tank that stores a medium (e.g., a hot water tank), it will be appreciated the concepts described herein are also applicable to "tankless" water heaters. In tankless water heaters, water or some other medium is quickly heated at a manifold as the water is flowing to a zone. Other variations are also possible.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A boiler system, comprising:
   a temperature control element configured to provide calls for heat when a temperature within a facility is below a setting value;
   a boiler comprising a medium, which during operation is regulated to a temperature between a low limit and a high limit;
   a medium heating element configured to raise the temperature of the medium upon receiving the calls for heat and to allow the temperature of the medium to lower when the calls for heat are concluded; and
   a monitoring element configured to monitor the calls for heat provided to the boiler, to determine a prevalence of the calls for heat over a monitoring window, and to selectively adjust the low limit based upon the prevalence of the calls for heat.

2. The boiler system of claim 1, wherein the prevalence of the calls for heat comprises a total number of calls for heat over the monitoring window.

3. The boiler system of claim 2, wherein if the total number of calls for heat over the monitoring window is less than a threshold value the monitoring element is configured to generate a control signal that turns the boiler off.

4. The boiler system of claim 3, wherein the monitoring element is configured to adjust the size of the threshold value, so as to vary how quickly the boiler is turned off.

5. The boiler system of claim 3, wherein the threshold value has a non-zero value.

6. The boiler system of claim 3, wherein the high limit has a value that is independent of a difference between the total number of calls for heat and the threshold value.

7. The boiler system of claim 1, wherein the prevalence of the calls for heat comprises a total time in which calls for heat are made over the monitoring window.

8. The boiler system of claim 1, wherein the boiler comprises:
   a storage tank configured to store the medium;
   a temperature control element configured to generate the calls for heat;
   a controller having an input interface configured to receive the calls for heat from the temperature control element and an adjustment signal from the monitoring element, and an output interface configured to provide a control signal in response to the received signals; and
   wherein the medium heating element is configured to receive the control signal from the controller.

9. The boiler system of claim 8, wherein the monitoring element is configured to indirectly detect the calls for heat by monitoring a temperature of the medium within the storage tank.

10. The boiler system of claim 1, wherein the monitoring element is configured to adjust the size of the monitoring window, so as to vary how quickly the boiler is turned off.

11. A boiler system, comprising:
    a temperature control element configured to provide a call for heat when a temperature within a facility is below a setting value;
    a controller configured to receive the call for heat from the temperature control element and to generate a control signal in response to the call for heat;
    a medium heating element configured to raise a temperature of the medium in response to the call for heat;
    a communication channel configured to relay a call for heat from the temperature control element to the controller; and
    a monitoring element coupled to the communication channel, the monitoring element configured to monitor the calls for heat placed on the boiler, to determine a total number of calls for heat over a monitoring window, and to turn off the boiler system if the total number of calls for heat is less than a threshold value.

12. The boiler system of claim 11, wherein the monitoring element is configured to adjust a size of the monitoring window, so as to vary how quickly the boiler is turned off.

13. The boiler system of claim 11, wherein the monitoring element is configured to adjust a value of the threshold value, so as to vary how quickly the boiler is turned off.

14. The boiler system of claim 11, wherein the facility comprises a plurality of different zones, each zone comprising a separate temperature control element configured to regulate the temperature within the zone; and wherein the monitoring element is configured to separately monitor the calls for heat from the different zones, such that the boiler is turned off if the number of calls for heat over the monitoring window is less than the threshold value for each of the different zones.

15. The boiler system of claim 14, wherein the facility comprises a plurality of different zones, each zone comprising a separate temperature control element configured to regulate the temperature within the zone; and wherein the monitoring element is configured to collectively monitor the number of calls for heat from the different zones, such that the boiler is turned off if a collective number of calls for heat is less than the threshold value.

16. A method for adjusting a controller low limit (LL) based upon a prevalence of calls for heat, the method comprising:

providing a controller, the controller configured to:
receive a call for heat from a temperature control element and to generate a control signal in response to the call for heat;
turn on a boiler comprising a medium in response to the control signal, which during operation is regulated to a temperature between a low limit and a high limit;
operate a medium heating element to raise the temperature of the medium, to a temperature that is between the low limit and the high limit, upon receiving the one or more calls for heat;
allow the temperature of the medium to lower when the one or more calls for heat are concluded;
operating a monitoring element to determine a prevalence of the calls for heat over a monitoring window, and to selectively adjust the low limit based on the prevalence of calls for heat.

17. The method of claim 16, wherein the prevalence of calls for heat comprises a total number of calls for heat over the monitoring window.

18. The method of claim 17, further comprising:
turning off the boiler, if the total number of calls for heat over monitoring window is less a threshold value.

19. The method of claim 17, further comprising:
adjusting the size of the monitoring window, so as to vary how quickly the boiler is turned off.

20. The method of claim 16, wherein the prevalence of calls for heat comprises a total time in which the calls for heat are made over the monitoring window.

* * * * *